United States Patent [19]

Okada et al.

[11] Patent Number: 5,013,888
[45] Date of Patent: May 7, 1991

[54] SELF-CLEANING PLATE SHAPED DEVICE

[75] Inventors: Shoji Okada, Toyota; Naofumi Fujie, Nagoya; Tomoaki Imaizumi, Hoi; Koji Ito, Kariya; Yuji Ichikawa; Kazumi Hayashi, both of Okazaki, all of Japan

[73] Assignee: Aisin Seiki Kabushiki Kaisha, Kariya, Japan

[21] Appl. No.: 412,000

[22] Filed: Sep. 25, 1989

[30] Foreign Application Priority Data

Sep. 27, 1988 [JP] Japan .................. 63-241756
Sep. 30, 1988 [JP] Japan .................. 63-248362

[51] Int. Cl.⁵ .............................................. H05B 3/26
[52] U.S. Cl. ................................................... 219/219
[58] Field of Search ................ 219/219; 350/582, 588

[56] References Cited

U.S. PATENT DOCUMENTS

| 3,940,822 | 3/1976 | Emerick | 350/582 |
| 4,441,796 | 4/1984 | Shaw | 350/582 |
| 4,833,373 | 5/1989 | Doi et al. | 318/114 |

FOREIGN PATENT DOCUMENTS

| 1959650 | 6/1971 | Fed. Rep. of Germany | 219/219 |
| 2751008 | 5/1978 | Fed. Rep. of Germany | 219/219 |
| 3638983 | 5/1988 | Fed. Rep. of Germany | 350/582 |
| 2448999 | 10/1980 | France | 350/582 |
| 59-8548 | 1/1984 | Japan | |
| 59-40145 | 3/1984 | Japan | . |
| 61-30552 | 2/1986 | Japan | . |
| 62-165127 | 7/1987 | Japan | 350/582 |
| 62-238149 | 10/1987 | Japan | . |
| 62-191550 | 12/1987 | Japan | . |

Primary Examiner—Teresa J. Walberg
Attorney, Agent, or Firm—Burns, Doane, Swecker & Mathis

[57] ABSTRACT

A self-cleaning plate shaped device for use in an automotive rear view mirror. The device preferably includes a mirror and a vibrator disposed on the mirror for propagating oscillations in the mirror substantially entirely parallel to the plane of the mirror. The vibrations remove foreign substances from the mirror. The mirror also includes a heater disposed on the back of the mirror for distributing heat substantially entirely throughout the mirror. When the mirror is heated by the heater, a moisture blur or the like are evaporated quickly and removed from the reflecting surface of the mirror. Further, frost, ice and the like is melted into water drops, and removed from the reflecting surface of the mirror due to the vibration of the mirror by the vibrator.

5 Claims, 8 Drawing Sheets

SELF-CLEANING PLATE SHAPED DEVICE

BACKGROUND OF THE INVENTION

1. Field of the Invention

This invention relates to a self-cleaning plate shaped device which, for example, can be utilized to remove foreign substances from a plate member such as an automotive rear mirror.

2. Description of the Related Art

Figure 14:
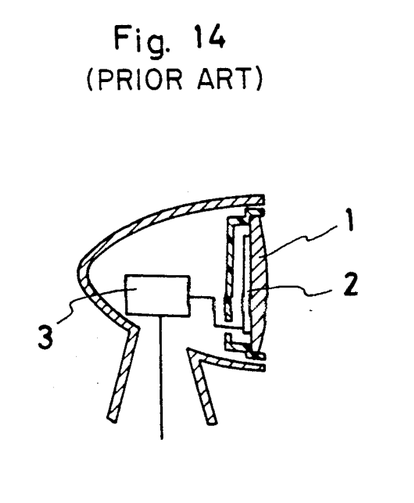
FIG. 14 is a cross-sectional view showing a conventional device.

Japanese laid-open patent publication No. 59-8548 published on Jan. 17, 1984 discloses a conventional cleaning device for an automotive rear view mirror (see FIG. 14). The cleaning device preferably includes a plate member 1 which is a rear-view mirror for an automobile. A piezoelectric vibrator 2 is affixed to the plate member 1. An oscillator 3 is electrically connected to the vibrator 2 in order to supply A.C. power. When the plate member 1 is oscillated by the vibrator 2, water droplets on the plate member 1 are removed. The water droplets drip off or are atomized into a spray.

Japanese utility model laid-open patent publication No. 59-40145 published on Mar. 14, 1984 discloses another conventional cleaning device. (see FIG. 15). In this device, a heater 4 is affixed to a plate member 1 in order to heat the plate member 1. When the plate member 1 is heated by the heater 4, water drops on the plate member 1 are evaporated due to the electric power supplied across the terminals 5 and 6.

Figure 15:
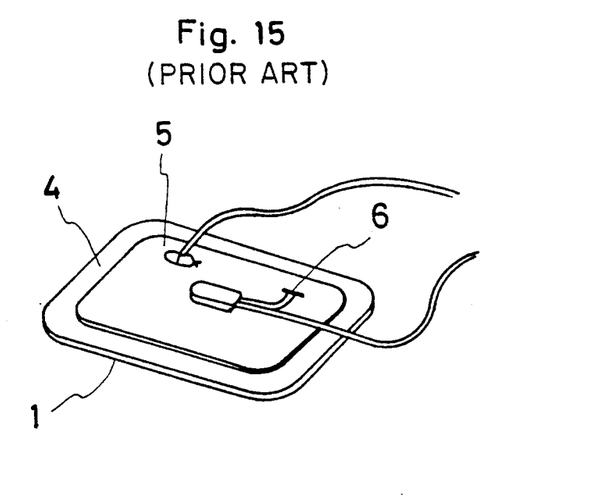
FIG. 15 is a perspective view showing a conventional device.

The vibrator 2 of Japanese Patent Publication No. 59-8548 can remove the water drops relatively quickly, but it cannot generate enough heat for melting and removing frost and ice on the plate member 1. On the other hand, the heater 4 of Japanese Patent Publication No. 59-40145 can remove water drops, frost and ice, but the heater 4 requires a relatively long time.

SUMMARY OF THE INVENTION

Accordingly, one of the objects of this invention is to obviate the drawbacks of the above-described devices.

Further, it is the object of this invention to remove the water drops from the entire surface of a plate member quickly.

Furthermore, it is another object of this invention to remove frost, ice and similar accumulations from the entire surface of a plate member quickly.

To achieve the above objects, and in accordance with the principles of the invention as embodied and broadly described herein, the self-cleaning plate shaped device comprises a generally planer member, vibrating means mounted on the plate member for propagating oscillations in the plate member substantially entirely parallel to the plane of the plate member in order to remove foreign substances from the plate member, and heating means mounted on the plate member for distributing heat throughout substantially the entire plate member.

Preferably, the vibrator means includes an oscillation means for generating sine waves in the plate member.

More preferably, the vibrator means includes an oscillation means for generating radial contractions and expansions.

BRIEF DESCRIPTION OF THE DRAWINGS

The accompanying drawings, which are incorporated in and constitute a part of the specification, illustrate an embodiment of the invention, and together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompany drawings.

Figure 1:
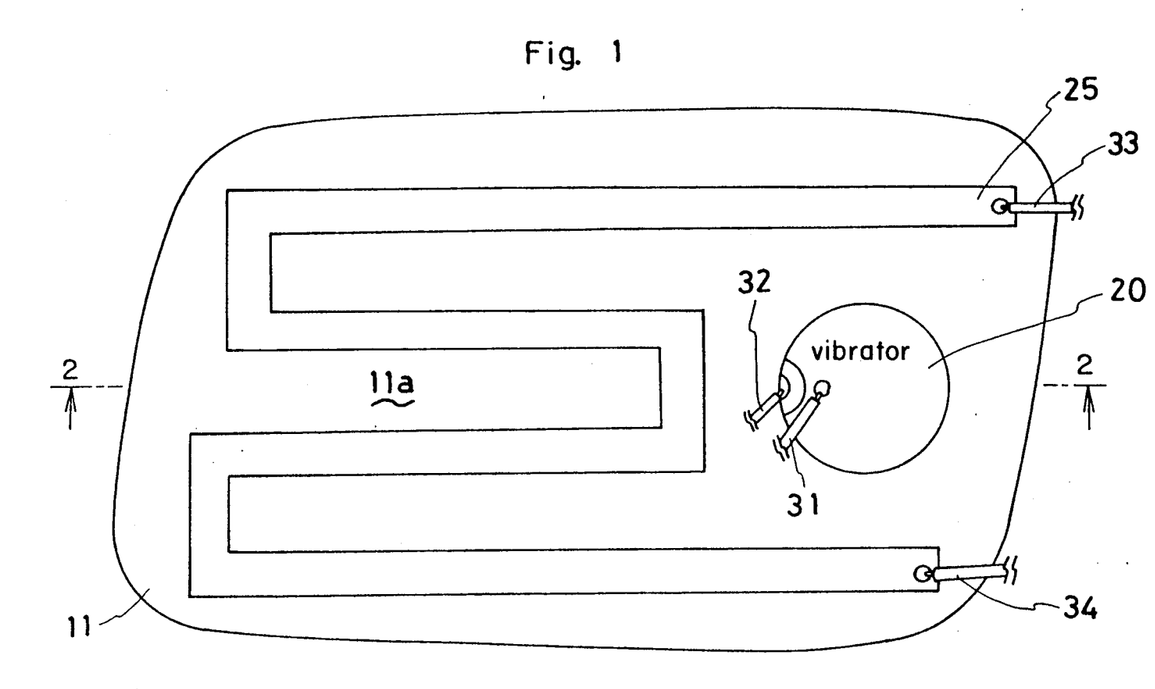
FIG. 1 is a plan view of a rear-view mirror in accordance with the first embodiment of this invention.
Figure 2:
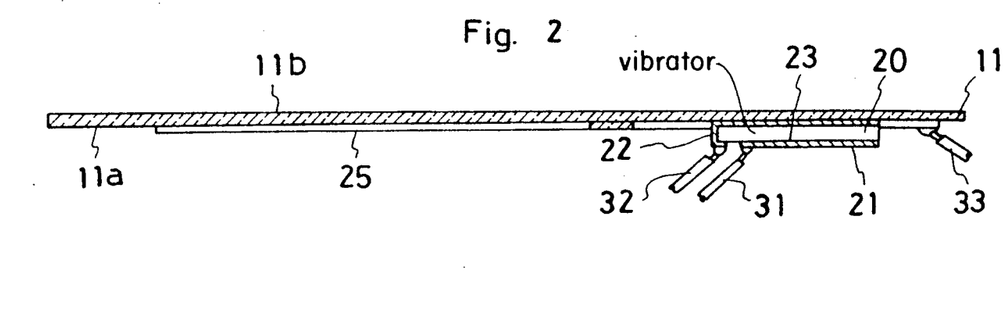
FIG. 2 is a cross-sectional view taking along line A—A in FIG. 1.
Figure 3:
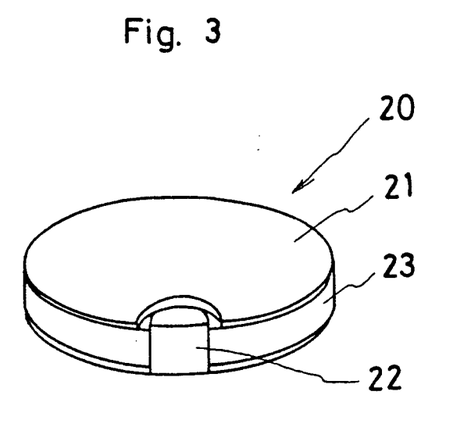
FIG. 3 is a perspective view of a piezoelectric vibrator in accordance with the first embodiment of this invention.

Referring now to FIGS. 1, 2 and 3, a self-cleaning plate shaped device is explained. A disc-shaped piezoelectric vibrator 20 is affixed to a mirror 11. The piezoelectric vibrator 20 has a pair of electrodes 21, 22 which are disposed opposite to each other. The electrodes 21, 22 are integrally formed on opposing surfaces of a piezoelectric element 23. A conductive wire 31 is soldered to the electrode 21. A conductive wire 32 is soldered to the electrode 22. The electrode 22 is rigidly affixed to the back side 11a of the mirror 11. When A.C. power is supplied to the vibrator 20 through the conductive wires 31, 32, the piezoelectric vibrator 20 expands and contracts not only in the direction of the thickness of the vibrator 20 i.e., the upward and the downward directions of the FIG. 2, but also along the radial directions of the vibrator 20 i.e., the right and the left directions of the FIG. 2.

Figure 8A:
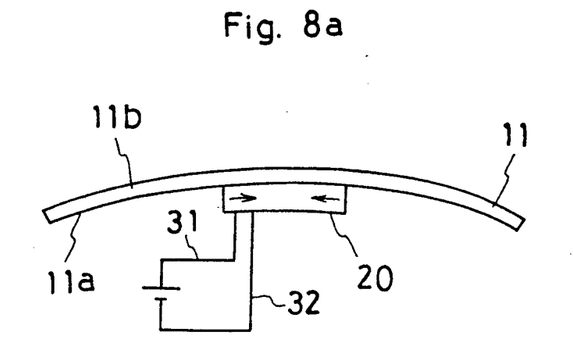
FIGS. 8a, 8b and 8c are diagrams for explaining the vibration of the vibrator in accordance with the first embodiment of this invention.
Figure 8B:
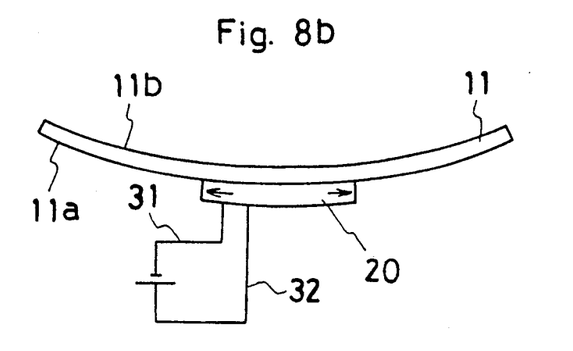
Figure 8C:
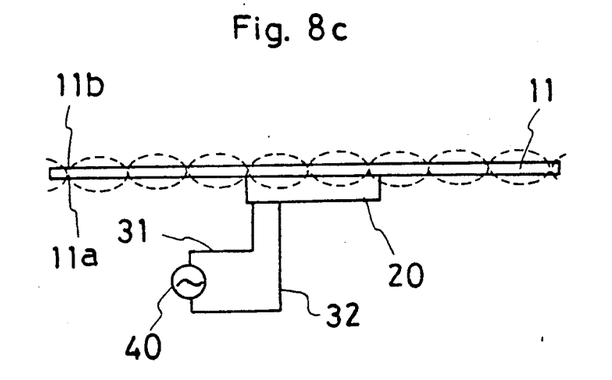

Referring now to FIG. 8a, the operation of the first embodiment is explained. When the conductive wire 31 is connected to the "+" terminal of a battery and the conductive wire 32 is connected to the "−" terminal of the battery, the vibrator 20 contracts mainly along the back surface 11a of the mirror 11. At this time, the back surface 11a of the mirror 11 receives a relatively large compressive stress from the vibrator 20. As a result, the mirror 11 is bent by the vibrator 20 as shown in FIG. 8a.

When the conductive wires 31, 32 are connected to the oscillator 40 and A.C. power is supplied to the vibrator 20, the vibrator 20 is expanded and contracted repeatedly. As a result, the mirror 11 is bent repeatedly. When the frequency of the oscillator 40 is properly selected, a uniform standing wave having a large amplitude is generated on the whole mirror 11 due to the resonance along the surface of the mirror 11. The reflecting surface 11b is moved at a relatively high velocity by the standing wave.

Therefore, water drops on the mirror 11 are imparted with relatively high kinetic energy from the mirror 11. The water droplets drop off the mirror and are atomized away from the reflecting surface 11b of the mirror 11.

The piezoelectric vibrator 20 has its own resonant frequency due to its dimension and shape. Accordingly, it is desirable for the dimensions and shape of the vibrator 20 to be selected based upon the resonant frequency of the mirror 11. A typical automotive mirror 11 which is commercially available has many resonant frequencies that vary from a relatively low frequency to a relatively high frequency. Accordingly, a proper frequency can be selected from a wide range of resonant frequencies.

For example, in this first embodiment, the vibrator 20 has a resonant frequency of approximately 70 KHz to 80 KHz. When the vibrator 20 is affixed to the mirror 11, the mirror 11 resonates at about 74 KHz.

Referring again to FIGS. 1 and 2, the self-cleaning plate shaped device is further explained. A heater 25 is mounted on the mirror 11. The heater 25 surrounds the vibrator 20. The heater 25 is preferably printed onto the back side 11a of the mirror 11 using a screen printing method. The heater 25 can also be mounted on the mirror 11 by using many different types of adhesives. However, some types of adhesives prevent the vibration on the mirror 11 because a layer of the adhesive may absorb the vibration on the mirror 11.

In the first embodiment, the heater 25 is preferably printed using the screen printing method. Therefore, an adhesive layer, which may absorb the vibrations, is not required. Conductive wires 33, 34 are soldered on both ends of the heater 25. When electric power is supplied to the heater 25, the heater 25 distributes the heat, and the entire mirror 11 is heated by the heater 25. When the mirror 11 is heated by the heater 25, a moisture blur or similar occurrence is quickly evaporated and removed from the reflecting surface 11b of the mirror 11. Moreover, frost, ice and the like are melted into water drops, and removed from the reflecting surface 11a of the mirror 11 due to the vibration on the mirror 11.

Figure 4:
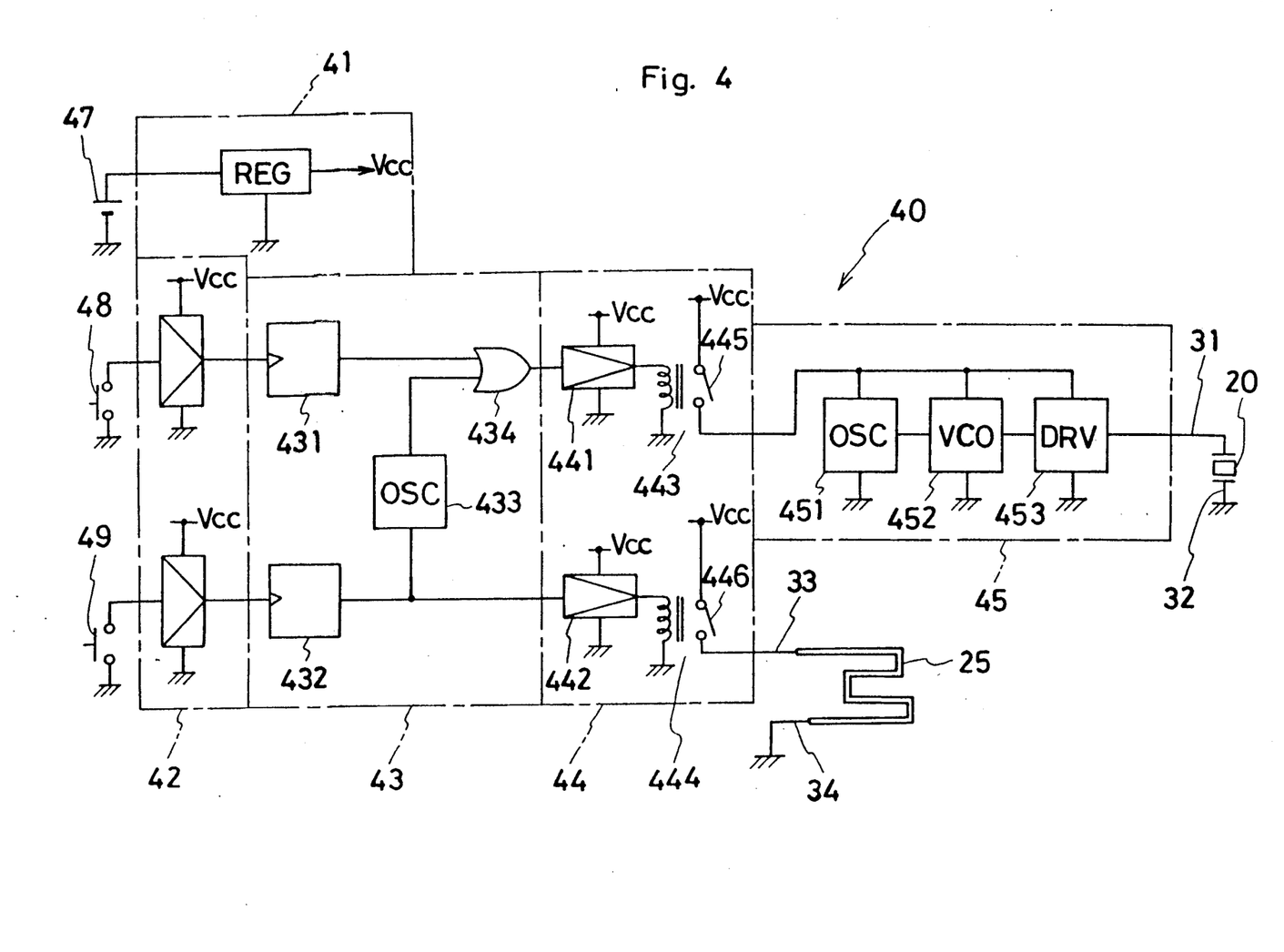
FIG. 4 is a circuit diagram of a control circuit in accordance with the first embodiment of this invention.

Referring to FIG. 4, a control circuit 40 for driving the vibrator 20 and the heater 25 is explained. The control circuit 40 comprises a power supplying circuit 41, an input buffer 42, a timer circuit 43, a relay circuit 44 and an oscillating circuit 45.

In an automotive compartment (not shown), a start switch 48 is provided near a driver's seat (not shown) for the driver's easy access. The control circuit 40 supplies the electric power to the oscillating circuit 45 for about 5 seconds after the start switch 48 is turned on. During this 5 seconds, the vibrator 20 generates the standing wave on the mirror 11, and the mirror 1 is vibrated. The water drops are removed from the mirror 11. When water drops are stuck to the mirror 11, a clear rear view can be obtained by turning on the start switch 48.

Also, in the automotive compartment, a heater switch 49 is also provided near the driver's seat for the driver's easy access. The control circuit 40 supplies the electric power to the heater 25 for about 15 minutes after the heater switch 49 is turned on. The control circuit 40 also supplies electric power to the oscillating circuit 45 every 30 seconds, and the mirror 11 vibrates for about 5 seconds. Thus, a clear rear view can be obtained after turning on the heater switch 49, even if the water drops, the moisture blur, the frost, the ice or the like are stuck to the mirror 11.

The power supplying circuit 41 is connected to the battery 47, and supplies a regulated voltage to the control circuit 40. The start switch 48 and the heater switch 49 are connected to the input buffer 42. The start switch 48 and the heater switch 49 are triggers for the timer circuit 43. The timer circuit 43 includes two one-shot multi-vibrators 431, 432, a square wave oscillator 433 and an "OR" gate 434.

Figure 5:
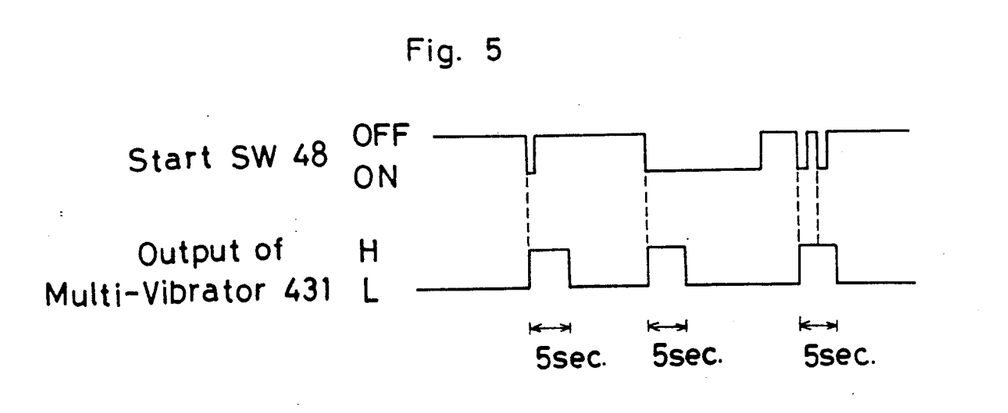
FIGS. 5 and 6 are timing charts of multi-vibrators installed in the control circuit of FIG. 4.

FIG. 5 shows the input and the output waveforms for the multi-vibrator 431. An "H" represents a high state, and a "L" represents a low state. The output of the multi-vibrator 431 is reversed from "L" to "H" conditions for only about 5 seconds as soon as the start switch 48 is turned on.

Figure 6:
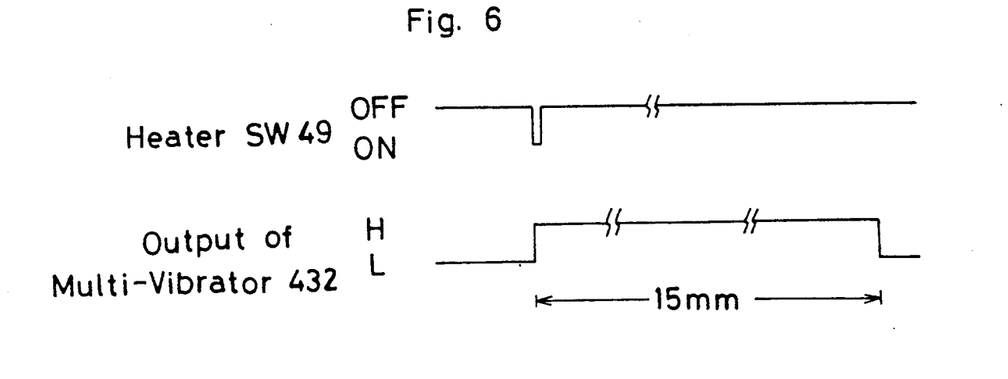

FIG. 6 shows input and output waveforms of the multi-vibrator 432. The output of the multi-vibrator 432 is reversed from "L" to "H" conditions for only about 15 minutes as soon as the heater switch 49 turns on.

Figure 7:
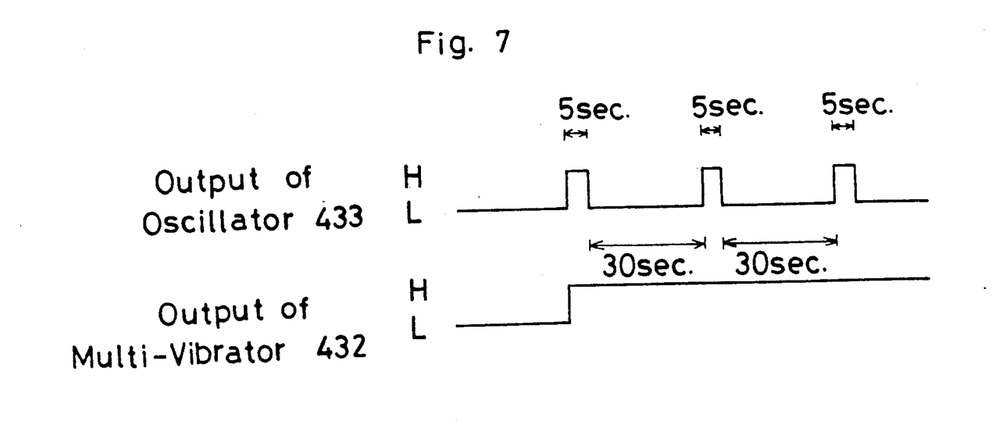
FIG. 7 is a waveform chart of an output signal from the oscillator installed in the control circuit of FIG. 4.

FIG. 7 shows the output waveforms of the square wave oscillator 433 and the multi-vibrator 432. The square wave oscillator 433 generates pulses which are 5 seconds long at 30 second intervals, as long as the multi-vibrator 432 generates an "H" output. The output of the square wave oscillator 433 is fed to the "OR" gate 434. The output of the "OR" gate 434 drives the relay 443 through a relay driver 441. A contact 445 of the relay 443 closes for about 5 seconds as soon as the start switch 48 is turned on. The contact 445 is then opened after the elapse of 5 seconds. While the contact 445 is closed, the electric power is supplied to the oscillating circuit 45. Further, the output of the multi-vibrator 432 drives the relay 444 through a relay driver 442. A contact 446 of the relay 444 closes for about 15 minutes as soon as the heater switch 49 is turned on. After the elapse of 15 minutes, the contact 446 is opened. As long as the contact 446 is closed, the electric power is supplied to the heater 25.

The oscillator 45 generates a sweep oscillation within a predetermined frequency range. The oscillator 45 comprises a sawtooth waveform generator 451, a voltage controlled oscillator 452 and a driver circuit 453. The sawtooth waveform generator 451 controls the oscillating frequencies of the voltage controlled oscillator 452. The voltage controlled oscillator 452 generates a sweep oscillation having a frequency range determined by the sawtooth waveform generator 451. This frequency range includes many of the resonant frequencies for resonating the mirror 11.

In the first embodiment, the frequency range is established from approximatley 70 KHz to 80 KHz. Further, the voltage controlled oscillator 452 sweeps the frequency range several times within 5 seconds. The output signal of the voltage controlled oscillator 452 is boosted by the driver circuit 453, which then drives the vibrator 20. When the oscillating frequency of the oscillator 45 varies within the desired frequency range, nodes and loops of the standing wave travel on the mirror 11, because the wavelength of the standing wave is changed. Accordingly, kinetic energy is distributed uniformly to the entire mirror 11. As a result, the water drops are simultaneously atomized away from the entire mirror 11. Further, according to the first embodiment, the frequency of the oscillator 45 is higher than the audible range. Therefore, the mirror 11 does not generate audible noise. Furthermore, according to the first embodiment, the frequency of the oscillator 45 is varied within a frequency range which includes many of the resonant frequencies of the mirror 11. Accordingly, the mirror 11 resonates reliably in accordance with the changes in the resonant frequencies.

Figure 9:
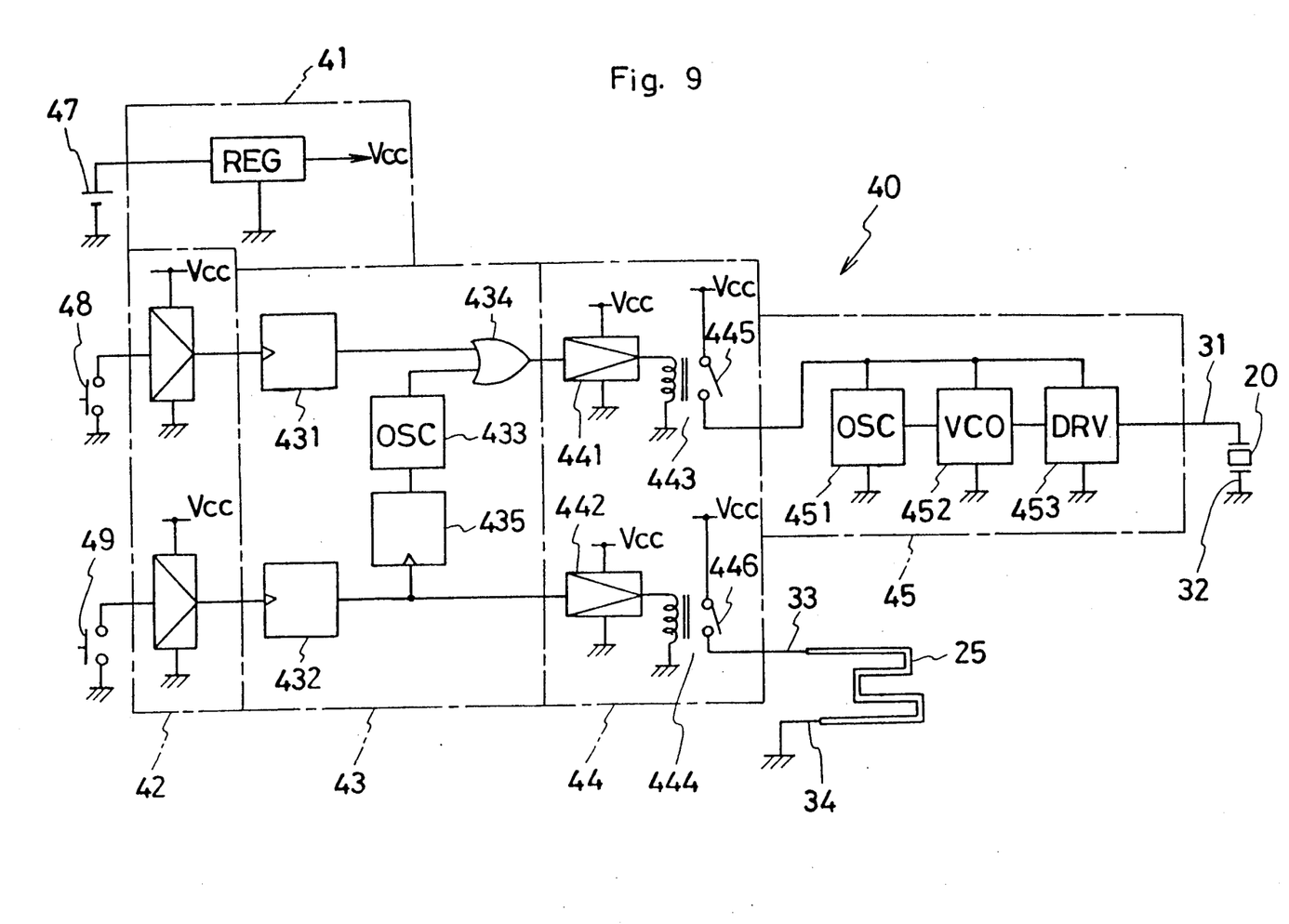
FIG. 9 is a circuit diagram of a control circuit in accordance with the second embodiment of this invention.

Referring to FIG. 9, the second embodiment of this invention is explained. FIG. 9 shows a circuit diagram for another control circuit 40. A one-shot multi-vibrator 435 is further installed in the control circuit 40. The multi-vibrator 435 is interconnected between the multi-vibrator 432 and the square wave oscillator 433. A delay time of approximately 1 minute is established in the multi-vibrator 435. In the second embodiment, the vibrator 20 starts vibrating about 1 minute after the generation of heat from the heater 25. In other words, the vibrator 20 starts vibrating after the frost and ice are melted. Thus, in the second embodiment, electric power is conserved by the reduction of wasted vibration. With respect to the second embodiment, the remaining construction and operation are substantially similar to the first embodiment of FIG. 4. Therefore, the remaining explanation of the second embodiment is omitted from this specification for the purposes of simplicity.

Figure 10:
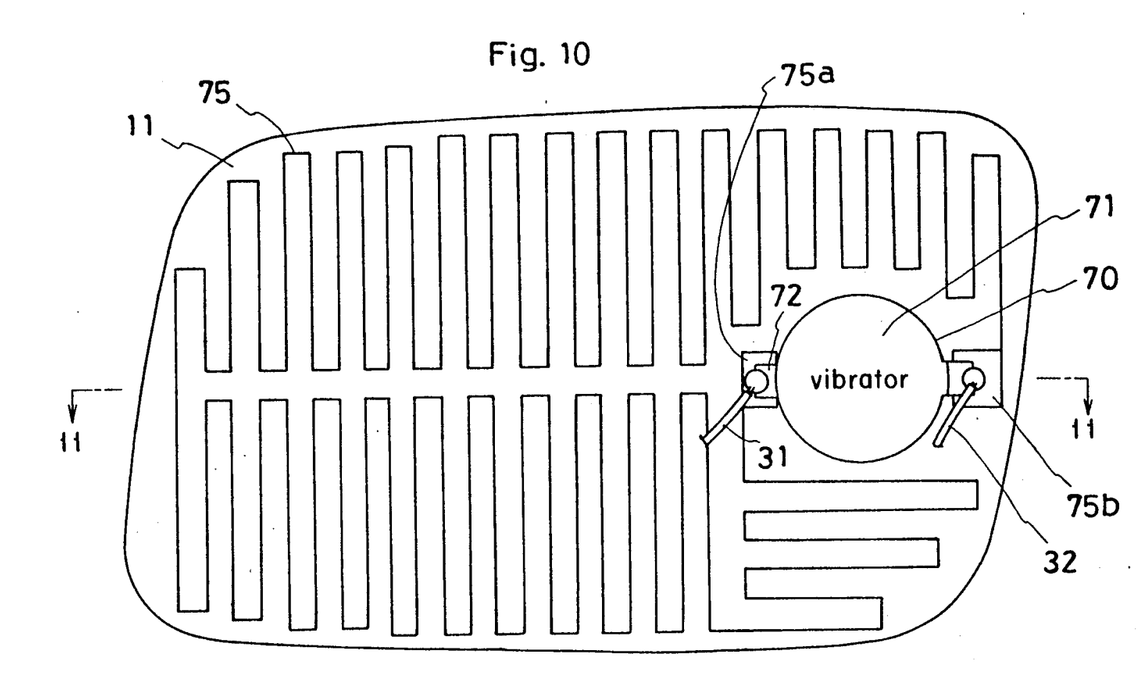
FIG. 10 is a plan view of a rear-view mirror in accordance with the third embodiment of this invention.
Figure 11:
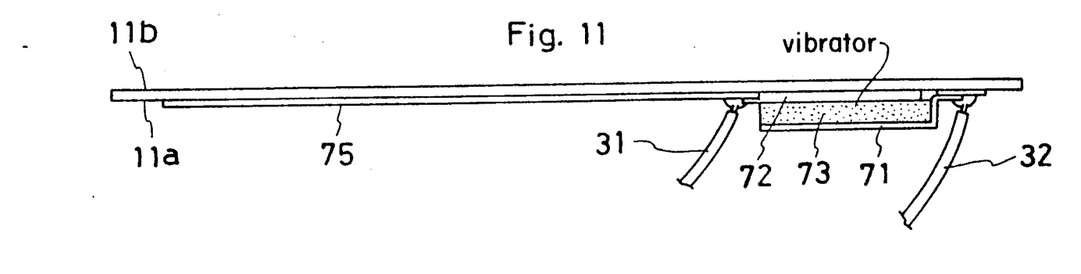
FIG. 11 is a cross-sectional view taking along line B—B in FIG. 10.
Figure 12:
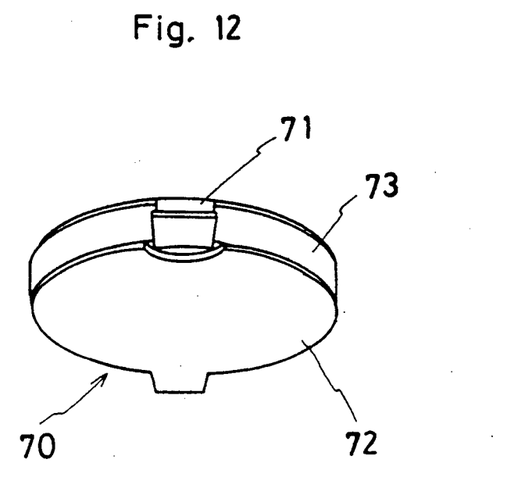
FIG. 12 is a perspective view of a piezoelectric vibrator in accordance with the third embodiment of this invention.

Referring now to FIGS. 10, 11 and 12, the third embodiment of this invention is explained. In the third embodiment, a piezoelectric vibrator 70 and a heater 75 are operated at the same time.

The heater 75 is printed on the back side 11a of the mirror 11. The heater 75 surrounds almost the entire area of the back side 11a of the mirror 11 except for a portion where the vibrator 70 is affixed. The heater 75 includes two relatively wide terminal portions 75a, 75b.

The vibrator 70 is preferably affixed to the mirror 11 by adhesive. The vibrator 70 comprises a piezoelectric element 73 and a pair of parallel flat electrodes 71 and 72 which are formed integrally with the piezoelectric element 73. The parallel flat electrode 71 is soldered to the terminal portions 75a with conductive wire 31. Further, the parallel flat electrode 72 is soldered to the terminal portions 75b with conductive wire 32. The vibrator 70 generates the vibration of the mirror 11 almost substantially the same as the vibrator 20 in FIG. 8. Therefore, the explanation for generating vibrations is omitted from this specification for the purposes of simplicity.

As long as electric power is supplied to the vibrator 70 and the heater 75, the heater 75 distributes the heat, and the mirror 11 is heated by the heater 75. When the mirror 11 is heated by the heater 75, a moisture blur or the like is evaporated quickly, and removed from the reflecting surface 11b of the mirror 11. Further, frost, ice and the like are melted into water drops, and removed from the reflecting surface 11a on the mirror 11 due to the vibration of the mirror 11.

Figure 13:
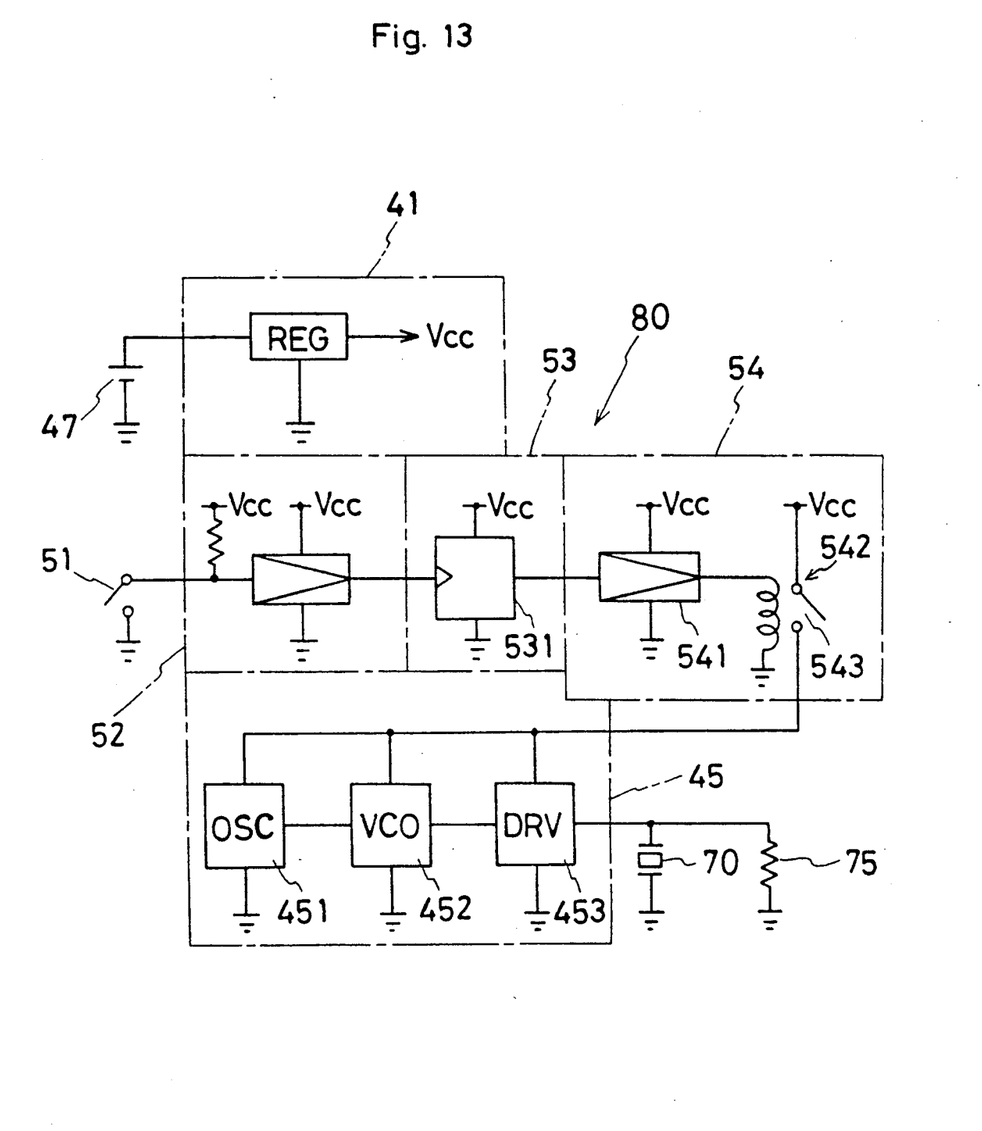
FIG. 13 is a circuit diagram of a control circuit in accordance with the third embodiment of this invention.

Referring to FIG. 13, a control circuit 80 is explained. The control circuit 80 comprises a power supplying circuit 41, an input buffer 52, a timer circuit 53, a relay circuit 54 and an oscillating circuit 45. The power supplying circuit 41 and the oscillating circuit 45 are substantially the same as the first embodiment in FIG. 4. Therefore, the explanation for them are omitted for the purposes of simplicity.

In an automotive compartment, a start switch 51 is provided near a driver's seat for driver's easy access. The control circuit 80 supplies the electric power to the oscillating circuit 45 for a predetermined period of time after the start switch 51 is turned on. A time period is defined by the timer circuit 53. The timer circuit includes one-shot multi-vibrator 531. The output of the multi-vibrator 531 is reversed about 50 seconds after the start switch 53 is turned on. The output of the multi-vibrator 531 is fed to the relay circuit 54. The relay circuit 54 comprises a relay driver 541 and a relay 542. The relay driver 541 closes a contact 543 of the relay 542 as long as the multi-vibrator 531 generates an "H" output. When the contact 543 is closed (i.e., for approximately 50 seconds), the vibrator 70 and the heater 75 are driven together and the water drops are removed from the mirror 11. Thus, a clear rear view can be obtained after turning on the start switch 53.

As to the third embodiment, the remaining construction and operation are substantially the same as the first embodiment in FIG. 4. Therefore, the remaining explanation for the third embodiment is omitted from this specification for the purposes of simplicity.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth.

What is claimed is:

1. A self-cleaning plate shaped device comprising:
   a generally planar plate member;
   vibrating means, disposed on the plate member, for propagating oscillations in the plate member substantially entirely parallel to the plane of the plate member by generation of radial contractions and expansions, and removing foreign substances from the plate member; and
   heating means disposed on the plate member for distributing heat substantially entirely throughout the plate member.

2. The device of claim 1 wherein the vibrating means includes an oscillation means for generating sine waves in the plate member.

3. The device of claim 1 wherein the vibrating means includes a substantially disc shaped vibrator, and means for supplying electric power to the vibrator.

4. The device of claim 1 wherein the plate member includes a mirrored surface and a back surface, and the vibration means is disposed on the back surface.

5. The device of claim 1 wherein the vibrating means includes an oscillation means for generating inaudible vibrations.

* * * * *